US009148652B2

(12) United States Patent  
Kim et al.

(10) Patent No.: US 9,148,652 B2  
(45) Date of Patent: Sep. 29, 2015

(54) VIDEO PROCESSING METHOD FOR 3D DISPLAY BASED ON MULTI-CUE PROCESS

(75) Inventors: Ji Won Kim, Seoul (KR); Gengyu Ma, Beijing (CN); Haitao Wang, Beijing (CN); Xing Mei, Beijing (CN); Ji Yeun Kim, Seoul (KR); Yong Ju Jung, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1154 days.

(21) Appl. No.: 13/067,465

(22) Filed: Jun. 2, 2011

(65) Prior Publication Data

US 2012/0007960 A1    Jan. 12, 2012

(30) Foreign Application Priority Data

Jun. 4, 2010 (CN) .......................... 2010 1 0198646

(51) Int. Cl.
*H04N 9/80* (2006.01)
*H04N 13/02* (2006.01)
*G06K 9/46* (2006.01)
*G11B 27/28* (2006.01)
*H04N 5/14* (2006.01)
*H04N 13/00* (2006.01)

(52) U.S. Cl.
CPC ............ *H04N 13/026* (2013.01); *G06K 9/4671* (2013.01); *G11B 27/28* (2013.01); *H04N 5/147* (2013.01); *H04N 2013/0074* (2013.01)

(58) Field of Classification Search
None
See application file for complete search history.

(56) References Cited

U.S. PATENT DOCUMENTS

| 7,130,461 | B2 * | 10/2006 | Rosenholtz | 382/165 |
| 2008/0304742 | A1 * | 12/2008 | Connell | 382/170 |
| 2008/0310727 | A1 * | 12/2008 | Wu et al. | 382/190 |
| 2009/0158179 | A1 * | 6/2009 | Brooks | 715/762 |
| 2012/0106850 | A1 * | 5/2012 | Koch et al. | 382/195 |

* cited by examiner

*Primary Examiner* — Heather Jones
(74) *Attorney, Agent, or Firm* — NSIP Law

(57) ABSTRACT

A video processing method for a three-dimensional (3D) display is based on a multi-cue process. The method may include acquiring a cut boundary of a shot by performing a shot boundary detection with respect to each frame of an input video, computing a texture saliency with respect to each pixel of the input video, computing a motion saliency with respect to each pixel of the input video, computing an object saliency with respect to each pixel of the input video based on the acquired cut boundary of the shot, acquiring a universal saliency with respect to each pixel of the input video by combining the texture saliency, the motion saliency, and the object saliency, and smoothening the universal saliency of each pixel using a space-time technology.

19 Claims, 13 Drawing Sheets

FIG.1
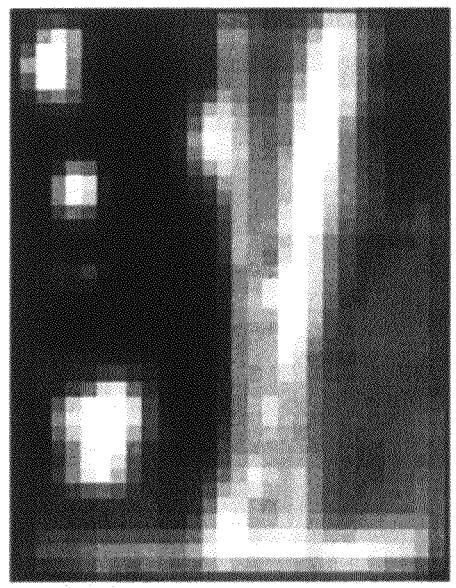
120
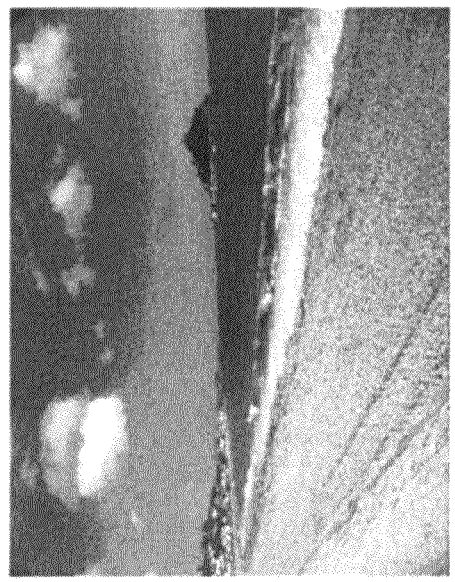
110

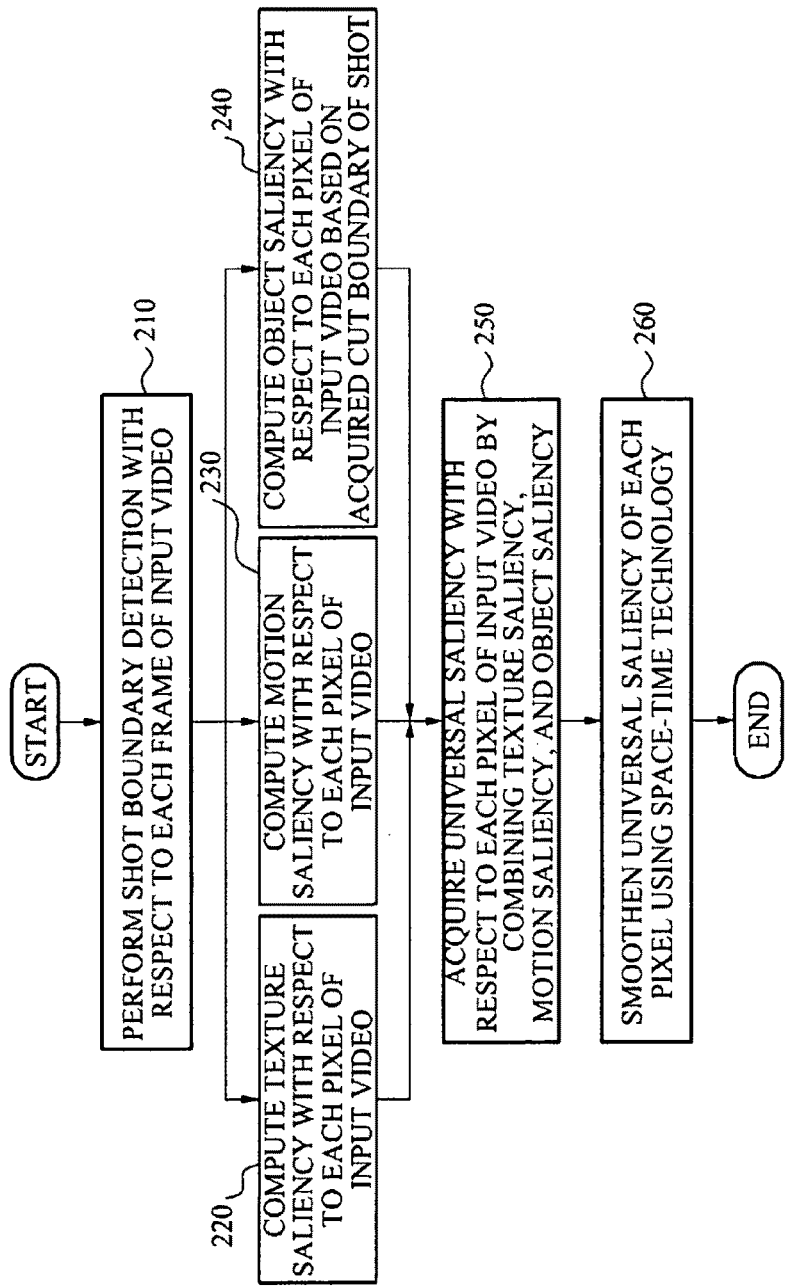

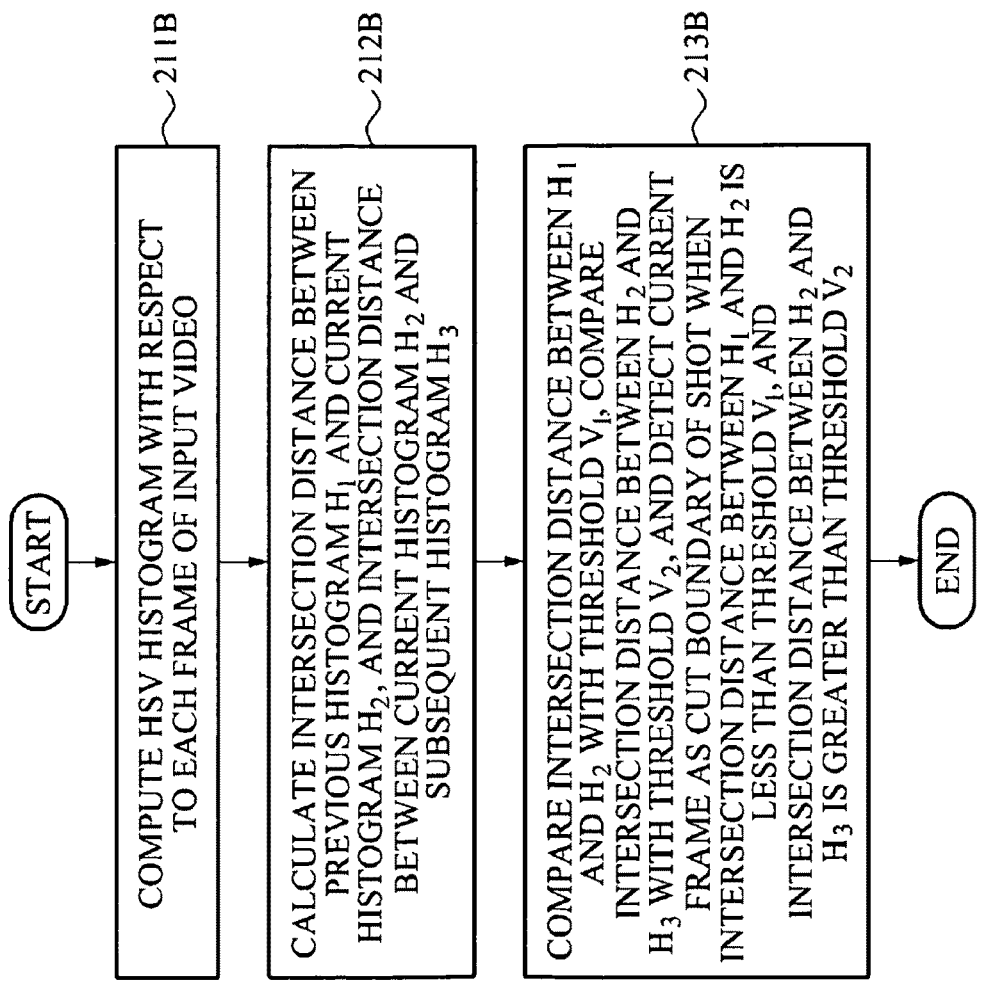

VIDEO PROCESSING METHOD FOR 3D DISPLAY BASED ON MULTI-CUE PROCESS

CROSS-REFERENCE TO RELATED APPLICATIONS

This application claims the priority benefit of Chinese Patent Application No. 201010198646.7, filed on Jun. 4, 2010, in the Chinese Intellectual Property Office, the disclosure of which is incorporated herein by reference.

BACKGROUND

1. Field

Example embodiments relate to a video processing method, and more particularly, to a video processing method for a three-dimensional (3D) display based on a multi-cue process.

2. Description of the Related Art

Recently, a three-dimensional (3D) display market has been rapidly expanding in various fields including the medical business, education, the entertainment business, the manufacturing business, and the like. Consumers may use a great number of 3D documents, in particular, 3D films. Thus, the 3D display market is expected to expand more rapidly in the years to come.

In the movie industry, numerous 3D films have been produced each year. However, most of the produced 3D films may correspond to image documents taken by a single camera and stored in a two-dimensional (2D) format. Since a monocular 2D video may not have depth information corresponding to an object photographed by a camera, a 3D image may not be directly displayed.

Thus, a huge potential of the 3D display market may enable a technology of converting a 2D image to a 3D image, to command attention from people in a related field.

Existing processes and technologies of converting a 2D image to a 3D image, for example, TRIDEF 3D EXPERIENCE of Dynamic Digital Depth (DDD) Inc., may comply with a similar process. After a likelihood depth map is estimated from an input video sequence, a 3D vision may be composed by combining a video with the likelihood depth map. To recover depth information of a video scene, the video may be analyzed using various depth cues, for example, a shadow, a motion estimation, a texture pattern, a focus/defocus, a geometric perspective, and a statistical model. Even though a conventional converting process may have an obvious effect, a practical application has not been prepared for the following reasons. A first reason may be based on an extreme assumption that a depth cue may have a favorable effect only with respect to a predetermined visual scene, and the predetermined visual scene may correspond to a video document having general interference. Secondly, it may be difficult to generate a consistent depth result by combining various cues. Thirdly, it may be inappropriate to recover a depth from a monocular image or a video. On some occasions, a visual depth may not be measured without multi-angle information to be used.

A saliency image may visually indicate an intensity of a visual scene. The saliency image has been studied for over a couple of decades in a brain and visual science field.

FIG. 1 illustrates an exemplary visual scene and a related saliency image. As illustrated in FIG. 1, a brightness region of the saliency image may indicate an object for commanding attention from an observer. Since the saliency image may provide relatively valuable information in a scene having a low level, the saliency image is being widely used in a great number of mechanical version processes, for example an automatic target detection and a video compression.

However, an existing technology using a saliency may not be applied to a conversion from a 2D image to a 3D image. Even though a saliency image generated through an existing process may sufficiently express an important object in a scene, the saliency image may have the following drawbacks.

A block shape may appear, saliency information may not accurately conform to a boundary of an object, a relatively large object may appear significantly brightly, and an overall object may not be filled.

A further drawback may be only a static characteristic, for example, an intense/saturation, a brightness, and a location may be processed, and a dynamic cue, for example, an object in motion and a person, providing importance visual information in a video document may not be processed.

SUMMARY

The example embodiments may provide a video processing method for a three-dimensional (3D) display based on a multi-cue process, and the method may improve an existing technology related with a saliency, and may apply the improved technology related with a saliency to a conversion from a 2D image to a 3D image.

The foregoing and/or other aspects are achieved by providing a video processing method for a three-dimensional (3D) display based on a multi-cue process, the method including acquiring a cut boundary of a shot by performing a shot boundary detection with respect to each frame of an input video, computing a texture saliency with respect to each pixel of the input video, computing a motion saliency with respect to each pixel of the input video, computing an object saliency with respect to each pixel of the input video based on the acquired cut boundary of the shot, and acquiring a universal saliency with respect to each pixel of the input video by combining the texture saliency, the motion saliency, and the object saliency.

The acquiring of the cut boundary of the shot may include computing a hue saturation value (HSV) histogram with respect to each frame of an input video, acquiring a histogram intersection distance by calculating a difference in the HSV histogram between a current frame and a previous frame, and comparing the histogram intersection distance with a threshold, and detecting the current frame as the cut boundary of the shot when the histogram intersection distance is less than the threshold.

The threshold may have the same value as half of a total number of pixels of a single frame image.

The acquiring of the cut boundary of the shot may include computing an HSV histogram with respect to each frame of an input video, acquiring a first intersection distance and a second intersection distance by calculating a difference in the HSV histogram between a previous frame and a current frame and a difference in the HSV histogram between the current frame and a subsequent frame, when the previous frame and the subsequent frame adjacent to the current frame are available, and comparing the first intersection distance with a first threshold, comparing the second intersection distance with a second threshold, and detecting the current frame as the cut boundary of the shot when first the intersection distance is less than first the threshold, and the second intersection distance is greater than the second threshold.

The first threshold may be the same as the second threshold, and the first threshold has the same value as half of a total number of pixels of a single frame image.

The computing of the texture saliency may include computing texture saliency $S_T(x)$ of a pixel x based on Equation 1, and computing a statistical difference of the pixel x based on Equation 2, wherein Equation 1 corresponds to $$S_T(x) = \sum_{lx=1}^{L_X} \sum_{ly=1}^{L_Y} W_{lx,ly} \cdot StatDiff(I^{lx,ly}(x)),$$

where a pair of variables (Ix, Iy) denotes a scale level in X and Y directions of a pyramid structure configured with respect to each frame, $L_X$ and $L_Y$ denote a maximum value of a scale level in X and Y directions of the pyramid structure, $W_{Ix,Iy}$ denotes a weight variable, and $StatDiff(I^{Ix,Iy}(x))$ denotes a function of computing the statistical difference of the pixel x on a scale level (Ix, Iy) image, and Equation 2 corresponds to $$StatDiff(I(x)) = \sum_{i=1}^{4} W_\mu |\mu_i - \mu_0| + W_\sigma |\sigma_i - \sigma_0| + W_\gamma |\gamma_i - \gamma_0|,$$

where $\mu_i$ denotes an intermediate value of a distribution of pixel values of block $B_i$, $\sigma_i$ denotes a standard deviation of the distribution of pixel values of block $B_i$, $\gamma_i$ denotes a value of skew of the distribution of pixel values of block $B_i$, $W_\mu$, $W_\sigma$, and $W_\gamma$ denote weight variables, blocks $B_1$, $B_2$, $B_3$, and $B_4$ denote blocks adjacent to central block $B_0$ at a top, bottom, left, and right sides of central block $B_0$, respectively, and the pixel x is constantly located at a predetermined position of central block $B_0$.

The computing of the motion saliency may include computing motion saliency $S_M(x)$ of each pixel of the input video using the simple statistical model of Rosenholtz.

The computing of the object saliency may include detecting a location and size of a face of a person based on the acquired cut boundary of the shot, and determining a location and size of a body of the person based on the detected location and size of the face of the person.

The computing of the object saliency may further include setting object saliency $S_O$ of a pixel located at a position within the face and the body of the person to a predetermined value, and setting object saliency $S_O$ of a pixel located at a position other than within the face and the body of the person, to another predetermined value.

The acquiring of the universal saliency may include computing the universal saliency with respect to a pixel x by combining the texture saliency, the motion saliency, and the object saliency based on Equation 3, wherein Equation 3 corresponds to $S(x) = W_T \cdot S_T(x) + W_M \cdot S_M(x) + W_O \cdot S_O(x)$, where $S_T(x)$ denotes the texture saliency of the pixel x, $S_M(x)$ denotes the motion saliency of the pixel x, $S_O(x)$ denotes the object saliency of the pixel x, $W_T$ denotes a weight variable of the texture saliency, $W_M$ denotes a weight variable of the motion saliency, and $W_O$ denotes a weight variable of the object saliency.

When a current shot corresponds to a natural scene, the acquiring of the universal saliency may include setting $W_T$ to "1," setting $W_M$ to "0," and setting $W_O$ to "0."

When a current shot corresponds to an action scene, the acquiring of the universal saliency may include setting $W_T$ to "0.7," setting $W_M$ to "0.3," and setting $W_O$ to "0."

When a current shot corresponds to a theater scene, the acquiring of the universal saliency may include setting $W_T$ to "0.5," setting $W_M$ to "0.2," and setting $W_O$ to "0.3."

The method may further include smoothening the universal saliency of each pixel using a space-time technology.

The smoothening may include computing smoothing saliency $S_S$, with respect to a pixel x present in frame t, based on Equation 4, wherein Equation 4 corresponds to $$S_S(x, t) = \sum_{t' \in N(t)} \sum_{x' \in N(x)} W_1(x, t, x', t') \cdot W_2(S(x', t'), S(x, t)) \cdot S(x', t'),$$

where N(x) defines a spatial neighborhood of the pixel x, N(t) defines a temporal neighborhood of the pixel x, $W_1(x, t, x', t')$ denotes a space-time weight between a pixel (x, t) and a neighboring pixel (x', t'), $W_2(S(x', t'), S(x, t))$ denotes an intensity weight between the pixel (x, t) and the neighboring pixel (x', t'), and S(x', t') denotes a universal saliency of the neighboring pixel (x', t').

By providing a video processing method for a 3D display based on a multi-cue process, an improved technology related with a saliency may be applied to a conversion from a 2D image to a 3D image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 1 illustrates an exemplary visual scene and a related saliency image;

FIG. 2 illustrates a flowchart of a video processing method for a three-dimensional (3D) display based on a multi-cue process according to example embodiments;

FIG. 3B illustrates a flowchart of detecting a boundary according to example embodiments;

DETAILED DESCRIPTION

Figure 3A:
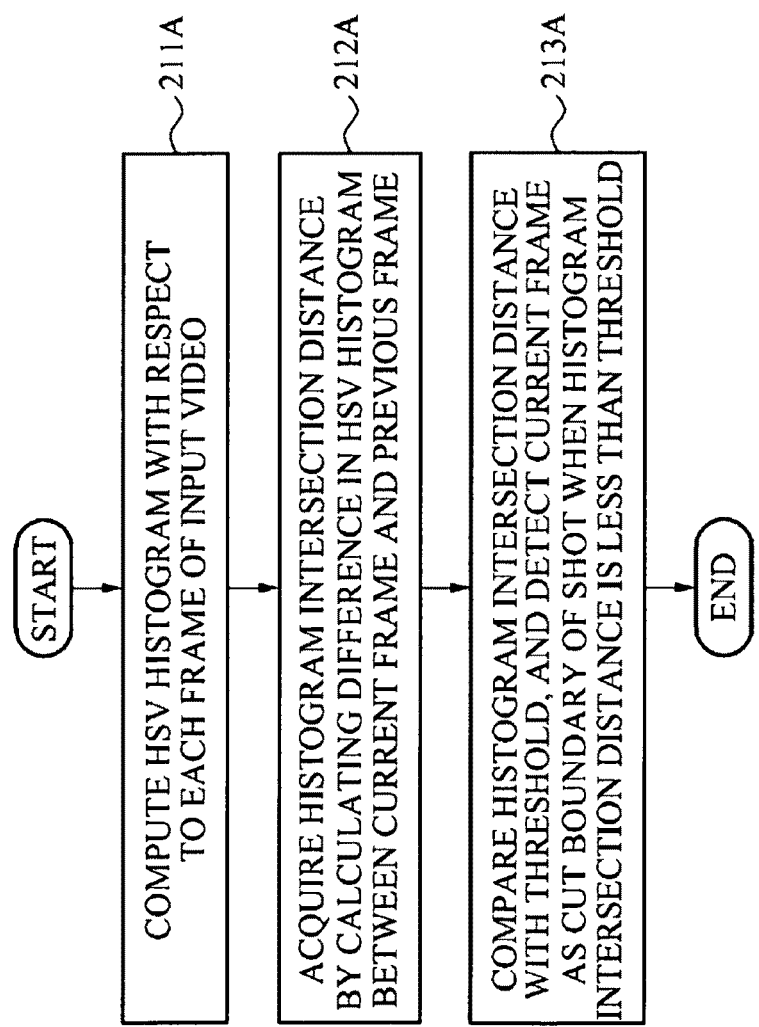
FIG. 3A illustrates a flowchart of detecting a boundary according to an existing technology.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an exemplary visual scene 110 and a related saliency image 120.

FIG. 2 illustrates a flowchart of a video processing method for a three-dimensional (3D) display based on a multi-cue process according to example embodiments.

Referring now to FIG. 2, in operation 210, a shot boundary detection may be performed with respect to each frame of an input video to acquire a cut boundary of a shot. The input video may be received or may be acquired by an input device such as a camera, for example.

The shot may correspond to an overall sequence coming from a frame of a single camera, for example. A video document may generally include several shots of each scene. The shot boundary may have several types, for example, a cut, a fade in/out, a dissolve, a wipe, and the like. Example embodiments may perform the detection with respect to a cut boundary where an abrupt change of a scene appears. As a process for a cut boundary detection, a process based on a pixel difference, a process based on a histogram, a process based on a discrete cosine transform (DCT) coefficient difference, a process based on motion information may be used. Considering an accuracy and a processing speed in an embodiment, a process based on a histogram having a relatively high performance may be used.

The video processing method of FIG. 2 may be executed by one or more processors.

FIG. 3A illustrates a flowchart of detecting a boundary according to an existing technology. Referring to FIG. 3A, in operation 211A, a hue-saturation-value (HSV) histogram may be computed with respect to each frame of an input video. In operation 212A, a histogram intersection distance may be acquired by calculating a difference in the HSV histogram between a current frame and a previous frame. In operation 213A, the histogram intersection distance may be compared with a threshold, and the current frame may be detected as the cut boundary of the shot when the histogram intersection distance is less than the threshold. Here, the threshold may be set to ½×"a total number of pixels of a single frame image." However, the threshold may not be limited to the embodiment, and the threshold may be corrected or changed.

To acquire a relatively preferable accuracy, a simple extension of a basic histogram algorithm may be performed in operation 210 when the previous frame and a subsequent frame adjacent to the current frame are available.

FIG. 3B illustrates a flowchart of detecting a boundary according to example embodiments. Referring to FIG. 3B, in operation 211B, an HSV histogram may be computed with respect to each frame of an input video. In operation 212B, the HSV histogram of a previous frame, the HSV histogram of a current frame, and the HSV histogram of a subsequent frame corresponding to $H_1$, $H_2$, and $H_3$, respectively, and an intersection distance between $H_1$ and $H_2$, and an intersection distance between $H_2$ and $H_3$ may be calculated. In operation 213B, the intersection distance between $H_1$ and $H_2$ may be compared with threshold $V_1$, the intersection distance between $H_2$ and $H_3$ may be compared with threshold $V_2$, and the current frame may be detected as the cut boundary of the shot when the intersection distance between $H_1$ and $H_2$ is less than threshold $V_1$, and the intersection distance between $H_2$ and $H_3$ is greater than threshold $V_2$. Here, it may be set such that threshold $V_1$=threshold $V_2$=½×"a total number of pixels of a single frame image." However, the threshold may not be limited to the embodiment, and the threshold may be corrected or changed within a scope clear to those skilled in the art of the present invention.

A cut boundary of a shot may be detected with respect to each frame of an input video using another appropriate process.

In operation 220, a texture saliency may be calculated with respect to each pixel of an input video.

Texture information may include reliable visual features of a visual scene. According to an embodiment, a pyramid structure may be configured with respect to each frame. A scale level in X and Y directions of the pyramid structure may be controlled by a pair of variables (Ix, Iy), and a current scale level may be set to half of an adjacent previous scale level:

The detecting a boundary of FIG. 3B may be executed by one or more processors.

Figure 4:
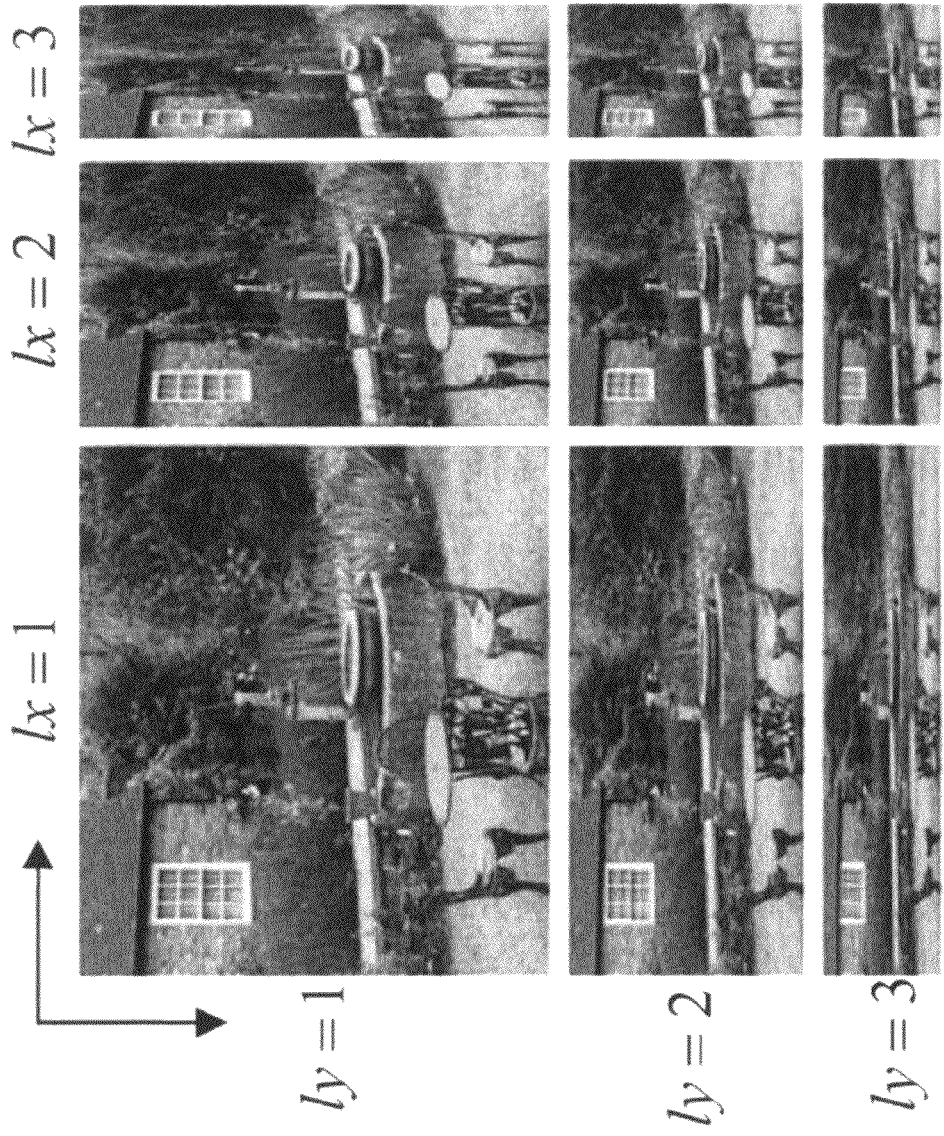
FIG. 4 illustrates a diagram of a pyramid level used for an example embodiment.

FIG. 4 illustrates a diagram of a pyramid level used for an example embodiment. However, each frame according to an embodiment may not be limited to have three scale levels in X and Y directions illustrated in FIG. 4, and a current scale level may not be limited to be set to half of an adjacent previous scale level.

Texture saliency $S_T(x)$ of a pixel x may be computed based on the following Equation 1.

$$S_T(x) = \sum_{lx=1}^{L_X} \sum_{ly=1}^{L_Y} W_{lx,ly} \cdot StatDiff(I^{lx,ly}(x)) \qquad \text{[Equation 1]}$$

In Equation 1, $L_X$ and $L_Y$ denote a maximum value of a scale level in X and Y directions of the pyramid structure, $W_{Ix,Iy}$ denotes a weight variable, and $StatDiff(I^{Ix,Iy}(x))$ denotes a function of computing the statistical difference of the pixel x on a scale level (Ix, Iy) image.

Figure 5:
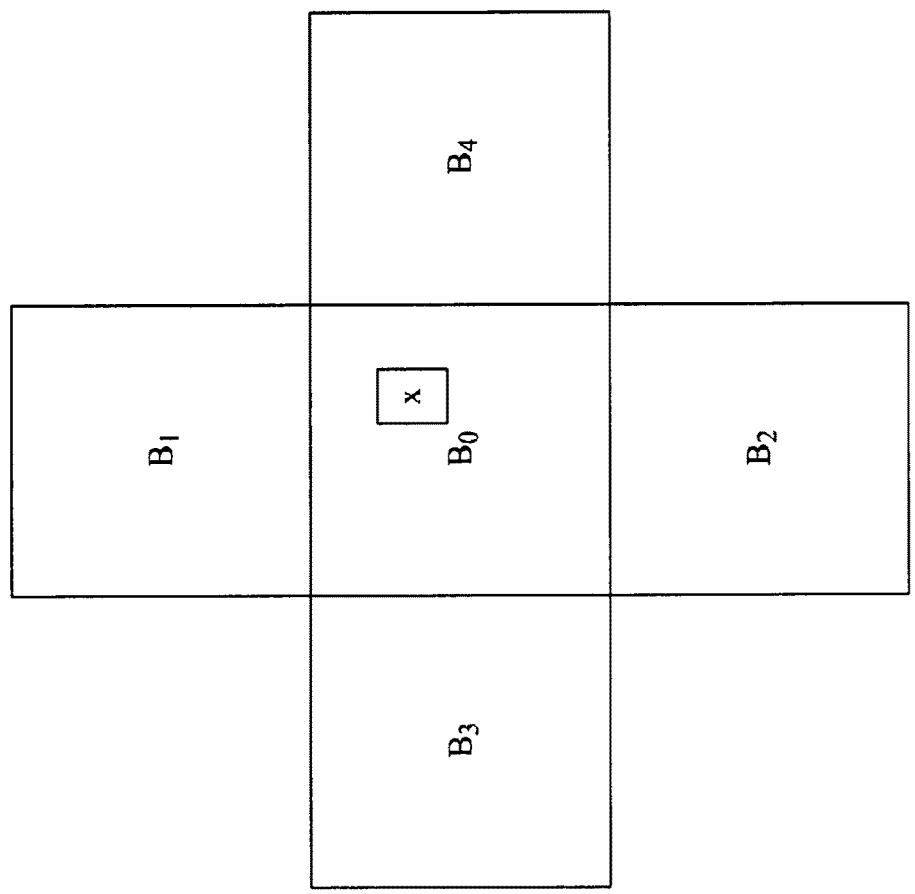
FIG. 5 illustrates a diagram of blocks for computing a statistical difference of a pixel according to example embodiments.

FIG. 5 illustrates a diagram of pixel blocks $B_0$, $B_1$, $B_2$, $B_3$, and $B_4$ for computing a statistical difference of a pixel according to example embodiments. As illustrated in FIG. 5, blocks $B_1$, $B_2$, $B_3$, and $B_4$ may correspond to blocks adjacent to a central block $B_0$ at a top, bottom, left, and right sides of the central block $B_0$, respectively, and a pixel x may be constantly located at a predetermined position of central block $B_0$. Positions of blocks $B_1$, $B_2$, $B_3$, and $B_4$ may vary depending on a change of a position of the pixel x. With respect to each block $B_i$ (i=0, 1, 2, 3, and 4), three statistical measurements according to a distribution of pixel values may be calculated. Here, the three statistical measurements may correspond to an intermediate value $\mu_i$, a standard deviation $\sigma_i$, and a value of skew $\gamma_i$. A statistical difference of the pixel x may be computed based on Equation 2.

$$StatDiff(I(x)) = \sum_{i=1}^{4} W_\mu |\mu_i - \mu_0| + W_\sigma |\sigma_i - \sigma_0| + W_\gamma |\gamma_i - \gamma_0| \qquad \text{[Equation 2]}$$

In Equation 2, $W_\mu$, $W_\sigma$, and $W_\gamma$ ($W_\mu+W_\sigma+W_\gamma=1$) may correspond to weight variables used to balance the contribution rate of the three statistical measurements.

A texture saliency may be computed successively with respect to each pixel of each frame of an input video, and the texture saliency may be acquired with respect to all pixels of all input videos.

As a subsequent operation, the texture saliency of each pixel may be smoothened using a cross-bilateral filter, and an error of a block artifact and an object boundary may be eliminated.

The texture saliency may be computed with respect to each pixel of the input video using another appropriate process.

In operation 230, a motion saliency may be computed with respect to each pixel of an input video. In this example, motion saliency $S_M(x)$ may be computed using the simple statistical model of Rosenholtz, and motion saliency $S_M(x)$ of the pixel x may be defined to be the Mahalanobis distance between a mean value $\mu_{\vec{v}}$ of a velocity field and a covariance $\Sigma_{\vec{v}}$ as the following Equation.

$$S_M(x) = |(\vec{v} - \mu_{\vec{v}})^T \Sigma^{-1} (\vec{v} - \mu_{\vec{v}})|$$

Here, an initial optical flow $\vec{v} = (v_x, v_y)$ of the pixel x may be estimated using a block matching algorithm.

The motion saliency may be computed successively with respect to each pixel of each frame of an input video, and the motion saliency may be acquired with respect to all pixels of all input videos.

Since there may be a relatively high possibility that a motion object abruptly deviates from a maximum distance of an intermediate value, between a motion of an object and an extension motion, the motion saliency of each pixel may be smoothened using a cross-bilateral filter, and a boundary may be generated by eliminating optical flow noise.

The motion saliency may be computed with respect to each pixel of the input video using another appropriate process.

In operation 240, an object saliency may be computed with respect to each pixel of the input video based on the acquired cut boundary of the shot.

The object saliency according to an embodiment may be expressed by displaying a predetermined object, in a visual scene of each frame image, in a highlighted manner. The object saliency of a pixel located at a position within the predetermined object may be set to a predetermined value, and a pixel located at a position other than within the predetermined object may be set to another predetermined value. For example, a face of a person, an actor or an actress on TV, cars in a sports video may correspond to the predetermined object. The predetermined object in the visual scene may perform a leading role in the corresponding visual scene and thus, the predetermined object may be included in a saliency image. A face of a person may correspond to a main element in various types of visual scenes and thus, a detection of the face of a person may be focused on, and a detected face of a person may be displayed in a highlighted manner.

According to an embodiment, a stable object saliency may be acquired by combining a technology of detecting a face of a person and a detecting technology having a confidence parameter c as a detection component. Based on the shot acquired in operation 210, a location of a face of a person may be detected using a Viola-Jones detector in a first frame of each shot of an input video. When the location of the face of the person is detected, a face tracking may be performed, with respect to a subsequent frame of a current shot, using an adaptive mid-value offset tracking technology. In this instance, a tracked location and size of the face of the person may have a format in a rectangular table. When the face of the person is not detected or the tracking is failed, the detection of the face of the person may be performed in a subsequent frame. To update the confidence parameter c, a detection result may be compared with a current tracking result. The confidence parameter c may be increased by "1" when a detected location of the face of the person is close to the tracking result. Otherwise, the confidence parameter c may be decreased by "1." For a case where the confidence parameter c is greater than "0," a degree of confidence of the tracking result may be relatively high and thus, the location of the face of the person may be subsequently updated using the tracking technology. For a case where the confidence parameter c is less than or equal to "0," the tracking result may be discarded, and the location of the face of the person may be initialized again using the detection result.

Figure 6A:
FIGS. 6A, 6B, and 6C illustrate diagrams of acquiring an object saliency according to example embodiments.
Figure 6B:
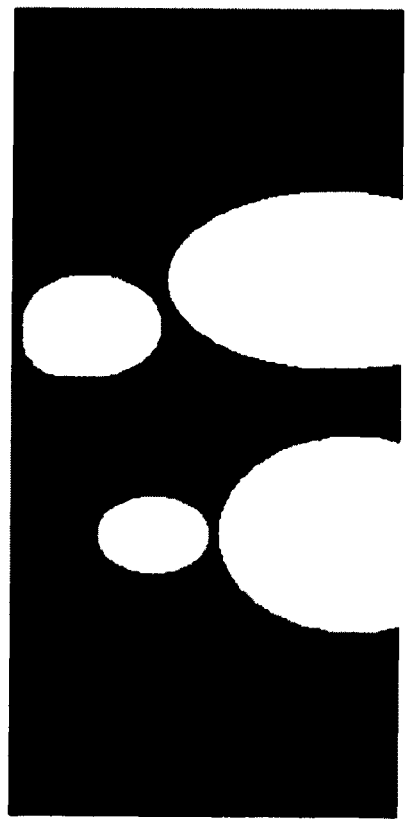
Figure 6C:
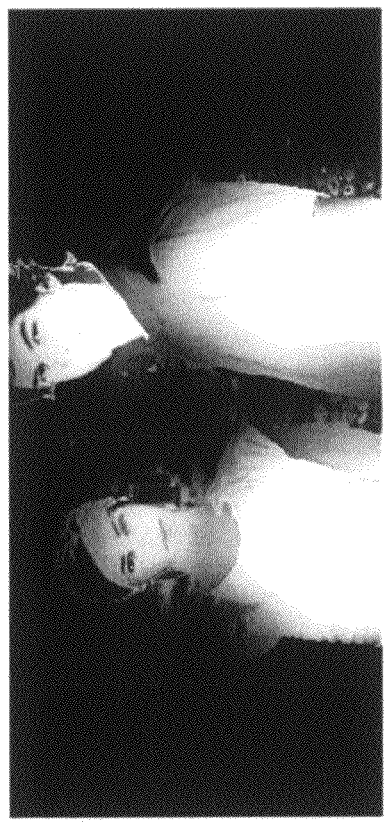

FIGS. 6A, 6B, and 6C illustrate diagrams of acquiring an object saliency according to example embodiments. A tracked face of a person may be marked with an oval shape using acquired information about a location and size of the face of the person. As illustrated in FIG. 6A, the oval shape may be inscribed in a rectangular table including the face of the person. An oval body may be generated by extending an oval face marked on the face of the person by n times (n=[2, 5]). A center of the oval body may be located on an extended line of a long axis of the oval face, and the oval body and the oval face may be close to each other. Referring to FIG. 6B, an initial saliency image may be generated by displaying the oval body and the oval face in a highlighted manner. Object saliency $S_O$ may be determined by setting a pixel value of two highlighted oval areas to h1 (h1>0), and by setting a pixel value of the other area to "0." Referring FIG. 6C, a shape boundary may be corrected by performing the cross-bilateral filter with an original color image with respect to the initial saliency image.

The object saliency may be computed with respect to each pixel of the input video using another appropriate process.

In operation 250, a universal saliency S(x) with respect to a pixel x may be acquired by combining the texture saliency, the motion saliency, and the object saliency based on the following Equation 3.

$$S(x) = W_T \cdot S_T(x) + W_M \cdot S_M(x) + W_O \cdot S_O(x) \qquad [\text{Equation 3}]$$

In Equation 3, $W_T$, $W_M$, and $W_O (W_T + W_M + W_O = 1)$ may correspond to weight variables of a corresponding saliency. To process a general visual scene, several different types of scenes may be defined. That is, a natural scene, an action scene, and a theater scene may be defined. Weight variables may be set for cases where a current shot corresponds to the natural scene, the action scene, and the theater scene, respectively as in the following Table 1.

TABLE 1

|  | weight variable | | |
| --- | --- | --- | --- |
| type | $W_T$ | $W_M$ | $W_O$ |
| natural scene | 1.0 | 0.0 | 0.0 |
| action scene | 0.7 | 0.3 | 0.0 |
| theater scene | 0.5 | 0.2 | 0.3 |

Here, the variables may merely be examples, and an observer may voluntarily select three scene types, and may set weight variables of the three scene types.

The video processing method for a 3D display based on a multi-cue process according to an embodiment has been independently generating a saliency image of each frame in a video sequence.

Since a portion of a saliency cue or saliency object may abruptly vanish, and a dark area in the visual scene may be displayed in a highlighted manner, a flicker may occur to cause an inconvenience and fatigue to an observer. Thus, in operation 206, a saliency image sequence may be smoothened using a space-time technology. Smoothing saliency $S_S$, with respect to a pixel x present in frame t, which may be expressed by a pixel (x, t), may be computed by the following Equation 4.

$$S_S(x, t) = \sum_{t' \in N(t)} \sum_{x' \in N(x)} W_1(x, t, x', t') \cdot W_2(S(x', t'), S(x, t)) \cdot S(x', t')$$

In Equation 4, N(x) defines a spatial neighborhood of the pixel x, N(t) defines a temporal neighborhood of the pixel x, $W_1(x,t,x',t')$ denotes a space-time weight between a pixel (x, t) and a neighboring pixel (x', t'), $W_2(S(x',t'), S(x,t))$ denotes an intensity weight between the pixel (x, t) and the neighboring pixel (x', t'), and S(x',t') denotes a universal saliency of the neighboring pixel (x', t'). Here, $W_1(x,t,x',t')+W_2(S(x',t'), S(x, t))=1$.

A smoothing saliency may be computed with respect to each pixel of the input video using another appropriate process.

Figure 7:
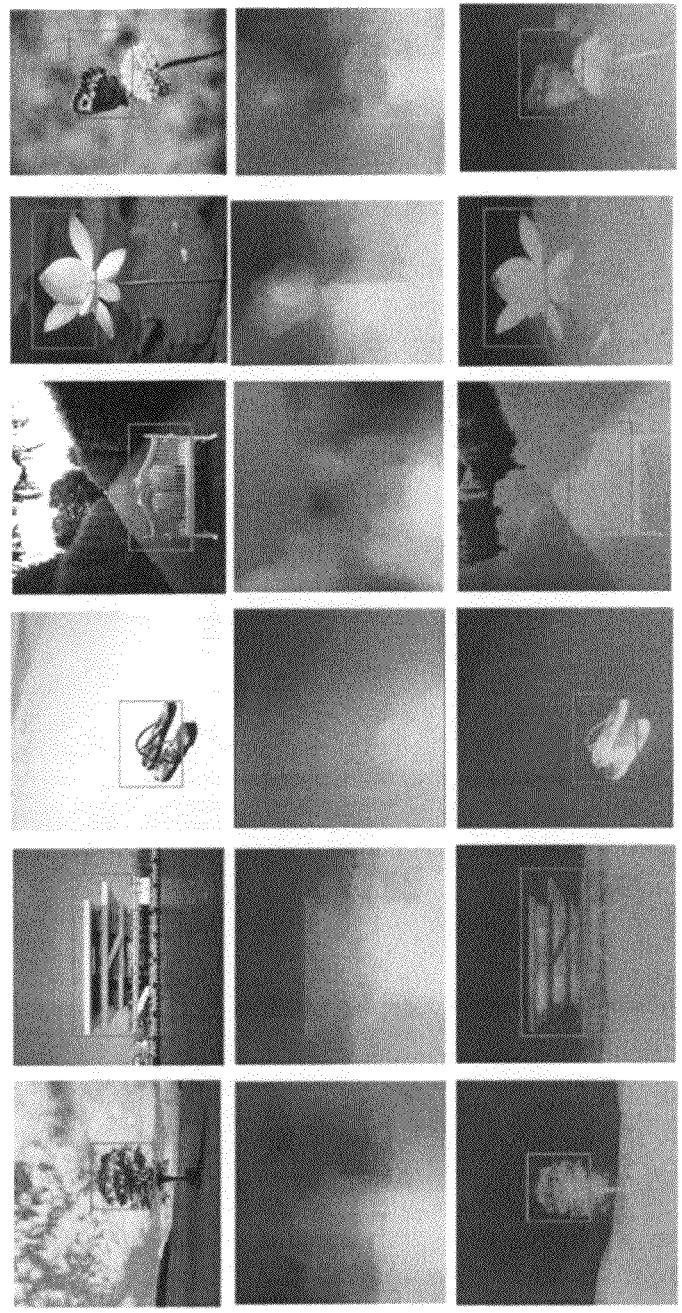
FIG. 7 illustrates a diagram of a test result of a natural scene according to example embodiments.
Figure 8:
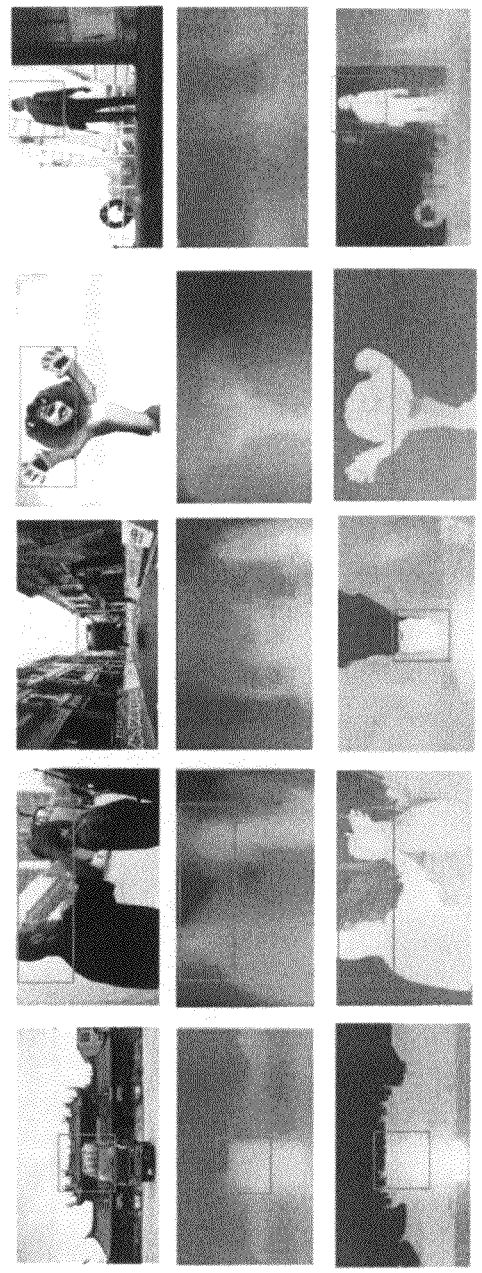
FIG. 8 illustrates a diagram of a test result of an action scene according to example embodiments.
Figure 9:
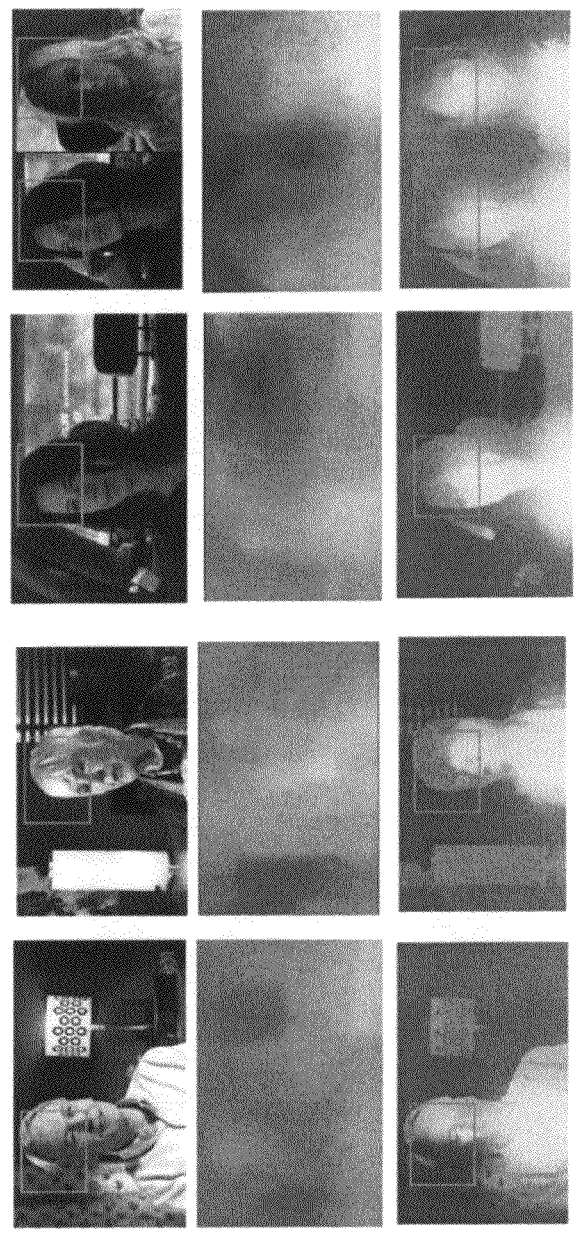
FIG. 9 illustrates a diagram of a test result of a theater scene according to example embodiments.

FIG. 7 illustrates a diagram of a test result of a video processing method, for a 3D display according to example embodiments, on a natural scene. FIG. 8 illustrates a diagram of a test result of a video processing method, for a 3D display according to example embodiments, on an action scene. FIG. 9 illustrates a diagram of a test result of a video processing method, for a 3D display according to example embodiments, on a theater scene.

As illustrated in FIG. 7, a first row corresponds to an original image. A second row corresponds to an image generated using an existing process of DDD Inc., and illustrates a smoothly converted similar depth image. A third row corresponds to an image generated using a method according to an embodiment, and may accurately display a saliency object in a highlighted manner.

As illustrated in FIG. 8, a first row corresponds to an original image. A second row corresponds to an image generated using an existing process of DDD. Inc., and illustrates an image where vague depth information is generated using narrowly increasing motion information. A third row corresponds to an image generated using a method according to an embodiment, and may sufficiently illustrate a motion object using a combination of a texture saliency and a motion saliency.

As illustrated in FIG. 9, a first row corresponds to an original image. A second row corresponds to an image generated using an existing process of DDD, inc, and a person is barely restored in the image. A third row corresponds to an image generated using a method according to an embodiment, and may appropriately illustrate a face and an upper body of a person using a combination of a texture saliency, a motion saliency, and an object saliency. Flickering artifacts may also be detected using the existing process of DDD. Inc.

An embodiment may enable a viewer to be presented with a more preferable visual experience in all types of test videos, in particular, in an action scene and a theater scene. The method according to an embodiment may be totally automated, and may process all types of videos, and a static image.

Figure 10:
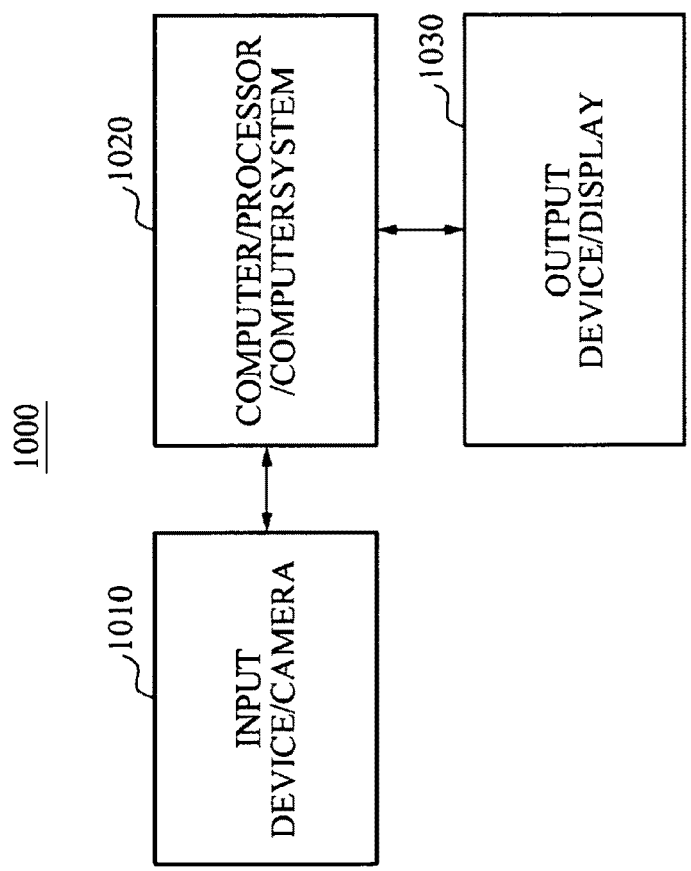
FIG. 10 illustrates an example of a computer system executing example embodiments

FIG. 10 illustrates an example of a computer system 1000 executing example embodiments. The computer system 1000 of FIG. 10 includes an input device 1010 in communication with a computer processor 1020 in communication with an output device 1030, such as a 3-dimensional display.

The video processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Further, the video processing method according to the above-described embodiments may be executed by one or more processors.

The above-described images may be displayed on a display.

Although embodiments have been shown and described, it would be appreciated by those skilled in the art that changes may be made in these embodiments without departing from the principles and spirit of the disclosure, the scope of which is defined by the claims and their equivalents.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A video processing method for a three-dimensional (3D) display based on a multi-cue process, the method comprising:
acquiring a cut boundary of a shot by performing a shot boundary detection with respect to each frame of an input video;
computing, by a processor, a texture saliency with respect to each pixel of the input video;
computing, by the processor, a motion saliency with respect to each pixel of the input video;
computing, by the processor, an object saliency with respect to each pixel of the input video based on the acquired cut boundary of the shot; and
acquiring, by the processor, a universal saliency with respect to each pixel of the input video by combining the texture saliency, the motion saliency, and the object saliency,
wherein the acquiring of the universal saliency comprises computing the universal saliency with respect to a pixel x by combining the texture saliency, the motion saliency, and the object saliency based on Equation 3, and
wherein Equation 3 corresponds to $$S(x)=W_T \cdot S_T(x)+W_M \cdot S_M(x)+W_O \cdot S_O(x),$$

where $S_T(x)$ denotes the texture saliency of the pixel x, $S_M(x)$ denotes the motion saliency of the pixel x, $S_O(x)$ denotes the object saliency of the pixel x, $W_T$ denotes a weight variable of the texture saliency, $W_M$ denotes a weight variable of the motion saliency, and $W_O$ denotes a weight variable of the object saliency.

2. The method of claim 1, wherein the acquiring of the cut boundary of the shot comprises:
    computing a hue saturation value (HSV) histogram with respect to each frame of an input video;
    acquiring a histogram intersection distance by calculating a difference in the HSV histogram between a current frame and a previous frame; and
    comparing the histogram intersection distance with a threshold, and detecting the current frame as the cut boundary of the shot when the histogram intersection distance is less than the threshold.

3. The method of claim 2, wherein the threshold has the same value as half of a total number of pixels of a single frame image.

4. The method of claim 1, wherein the acquiring of the cut boundary of the shot comprises:
    computing an HSV histogram with respect to each frame of an input video;
    acquiring a first intersection distance and a second intersection distance by calculating a difference in the HSV histogram between a previous frame and a current frame and a difference in the HSV histogram between the current frame and a subsequent frame, when the previous frame and the subsequent frame adjacent to the current frame are available; and
    comparing the first intersection distance with a first threshold, comparing the second intersection distance with a second threshold, and detecting the current frame as the cut boundary of the shot when first the intersection distance is less than first the threshold, and the second intersection distance is greater than the second threshold.

5. The method of claim 4, wherein the first threshold is the same as the second threshold, and the first threshold has the same value as half of a total number of pixels of a single frame image.

6. The method of claim 1, wherein the computing of the texture saliency comprises:
    computing texture saliency $S_T(x)$ of a pixel x based on Equation 1; and
    computing a statistical difference of the pixel x based on Equation 2,
    wherein Equation 1 corresponds to $$S_T(x) = \sum_{lx=1}^{Lx} \sum_{ly=1}^{Ly} W_{lx,ly} \cdot StatDiff(I^{lx,ly}(x)),$$

where a pair of variables (lx, ly) denotes a scale level in X and Y directions of a pyramid structure configured with respect to each frame, $L_x$ and $L_y$ denote a maximum value of a scale level in X and Y directions of the pyramid structure, $W_{lx,ly}$ denotes a weight variable, and StatDiff($I^{lx,ly}(x)$)) denotes a function of computing the statistical difference of the pixel x on a scale level (lx, ly) image, and Equation 2 corresponds to $$StatDiff(I(x)) = \sum_{i=1}^{4} W_\mu |\mu_i - \mu_0| + W_\sigma |\sigma_i - \sigma_0| + W_\gamma |\gamma_i - \gamma_0|,$$

where $\mu_i$ denotes an intermediate value of a distribution of pixel values of block $B_i$, $\sigma_i$ denotes a standard deviation of the distribution of pixel values of block $B_i$, $\gamma_i$ denotes a value of skew of the distribution of pixel values of block $B_i$, $W_\mu$, $W_\sigma$, and $W_\gamma$ denote weight variables, blocks $B_1$, $B_2$, $B_3$, and $B_4$ denote blocks adjacent to central block $B_0$ at a top, bottom, left, and right sides of central block $B_0$, respectively, and the pixel x is constantly located at a predetermined position of central block $B_0$.

7. The method of claim 1, wherein the computing of the motion saliency comprises computing motion saliency $S_M(x)$ of each pixel of the input video using the simple statistical model of Rosenholtz.

8. The method of claim 1, wherein the computing of the object saliency comprises:
    detecting a location and size of a face of a person based on the acquired cut boundary of the shot; and
    determining a location and size of a body of the person based on the detected location and size of the face of the person.

9. The method of claim 8, wherein the computing of the object saliency further comprises:
    setting object saliency $S_O$ of a pixel located at a position within the face and the body of the person to a predetermined value, and setting object saliency $S_O$, of a pixel located at a position other than within the face and the body of the person, to another predetermined value.

10. The method of claim 1, wherein, when a current shot corresponds to a natural scene, the acquiring of the universal saliency comprises setting $W_T$ to "1" setting $W_M$ to "0," and setting $W_O$ to "0".

11. The method of claim 1, wherein, when a current shot corresponds to an action scene, the acquiring of the universal saliency comprises setting $W_T$ to "0.7," setting $W_M$ to "0.3," and setting $W_O$ to "0".

12. The method of claim 1, wherein, when a current shot corresponds to a theater scene, the acquiring of the universal saliency comprises setting $W_T$ to "0.5," setting $W_M$ to "0.2," and setting $W_O$ to "0.3".

13. The method of claim 1, further comprising:
    smoothening the universal saliency of each pixel using a space-time technology.

14. The method of claim 13, wherein the smoothening comprises:
    computing smoothing saliency $S_s$, with respect to a pixel x present in frame t, based on Equation 4,
    wherein Equation 4 corresponds to $$S_S(x, t) = \sum_{t' \in N(t)} \sum_{x' \in N(x)} W_1(x, t, x', t') \cdot W_2(S(x', t'), S(x, t)) \cdot S(x', t'),$$

where N(x) defines a spatial neighborhood of the pixel x, N(t) defines a temporal neighborhood of the pixel x, $W_1(x,t,x',t')$ denotes a space-time weight between a pixel (x, t) and a neighboring pixel (x', t'), $W_2(S(x',t'),S(x,t))$ denotes an intensity weight between the pixel (x, t) and the neighboring pixel (x', t'), and S(x',t') denotes a universal saliency of the neighboring pixel (x', t').

15. The method of claim 1, further comprising:
generating, by the processor, an image based upon the universal saliency; and
displaying the generated image on a three-dimensional display.

16. A non-transitory computer-readable medium controlling a computer to execute the method of claim 1.

17. A video processing system for a three-dimensional (3D) display based on a multi-cue process, the system comprising:
an input device acquiring a cut boundary of a shot by performing a shot boundary detection with respect to each frame of an input video;
a computer generating an image by computing a texture saliency with respect to each pixel of the input video, computing a motion saliency with respect to each pixel of the input video, computing an object saliency with respect to each pixel of the input video based on the acquired cut boundary of the shot, and acquiring a universal saliency with respect to each pixel of the input video by combining the texture saliency, the motion saliency, and the object saliency; and
a three-dimensional display displaying the generated image,
wherein the acquiring of the universal saliency comprises computing the universal saliency with respect to a pixel x by combining the texture saliency, the motion saliency, and the object saliency based on Equation 3, and
wherein Equation 3 corresponds to $$S(x)=W_T \cdot S_T(x)+W_M \cdot S_M(x)+W_O \cdot S_O(x),$$

where $S_T(x)$ denotes the texture saliency of the pixel x, $S_M(x)$ denotes the motion saliency of the pixel x, $S_O(x)$ denotes the object saliency of the pixel x, $W_T$ denotes a weight variable of the texture saliency, $W_M$ denotes a weight variable of the motion saliency, and $W_O$ denotes a weight variable of the object saliency.

18. The video processing system of claim 17, wherein the input device comprises a camera.

19. The video processing system of claim 18, wherein the camera is a single camera.

* * * * *